United States Patent [19]
Snyder

[11] Patent Number: 5,960,924
[45] Date of Patent: Oct. 5, 1999

[54] MANUAL CLUTCH

[76] Inventor: Robert V. Snyder, 1112 West Ave., Hilton, N.Y. 14468

[21] Appl. No.: 09/058,616

[22] Filed: Apr. 10, 1998

[51] Int. Cl.⁶ .................................................. E16H 55/56
[52] U.S. Cl. ......................................... 192/85 A; 474/28
[58] Field of Search ........................... 192/85 A, 85 CA, 192/83; 474/13, 28; 92/117 A

[56] References Cited

U.S. PATENT DOCUMENTS

| | | |
|---|---|---|
| 3,605,510 | 9/1971 | Laughlin . |
| 3,605,511 | 9/1971 | Decshene . |
| 3,759,111 | 9/1973 | Hoff ........................................ 474/14 |
| 4,674,359 | 6/1987 | Hattori ..................................... 474/28 |
| 4,934,217 | 6/1990 | Biem ....................................... 74/837 |
| 4,949,827 | 8/1990 | Leigh-Monstevens et al. ... 192/85 CA |
| 4,986,403 | 1/1991 | Tipton ............................. 192/85 CA X |
| 4,991,400 | 2/1991 | Wilkinson .............................. 62/228.4 |
| 5,803,846 | 9/1998 | Yamada et al. ....................... 474/28 X |

*Primary Examiner*—Richard M. Lorence
*Attorney, Agent, or Firm*—Howard J. Greenwald

[57] ABSTRACT

An apparatus for manually engaging a primary clutch of a constantly variable transmission, which contains a fixed piston assembly enclosed within a movable cylinder assembly. The fixed piston assembly contains cylindrical center cup with a flange integrally connected to a first stepped cylindrical section, and a second stepped cylindrical section integrally connected to the first stepped cylindrical section. Several orifices extend through the first cylindrical section. A piston is connected to the second stepped cylindrical assembly. A movable cylinder is lcoated within the first stepped cylindrical section and is contiguous with the piston.

13 Claims, 7 Drawing Sheets

MANUAL CLUTCH

FIELD OF THE INVENTION

A manual actuator for manually controlling engagement of a constant variable transmission.

BACKGROUND OF THE INVENTION

The transmission system used on snowmobiles and some other recreational vehicles (commonly known as constantly variable transmissions, or "CVT"s) uses a clutch mechanism that incorporates weights and springs to provide engagement by centrifugal force at a predetermined engine speed. This speed is set by the use of movable weights and spring tension in the drive (primary) pulley in a belt and pulley set. The exact arrangement of the weights and spring(s) varies between manufacturers, but all operate similarly in principle and physical motion.

These constant variable transmission devices are well known to those skilled in the art and are disclosed, e.g., in U.S. Pat. No. 4,934,217 of Biem, the entire disclosure of which is hereby incorporated by reference into this specification. Reference may also be had to U.S. Pat. No. 4,991,400 of Wilkinson, whose disclosure is also hereby incorporated herein by reference.

One characteristic of the constant variable transmission system is the fixed engagement speed, and the need to accelerate the engine to this speed to cause actual engagement. Although this is normally not a significant weakness, there are cases when exact control of this engagement is desirable. The main example of this is in racing, where the ability to leave the starting line predictably is a major factor in success. The need to accelerate the engine from some point below engagement through the engagement speed is an imprecise operation in relation to the frame of time needed to ideally accomplish clutch engagement (several tenths of a second).

To the best of applicant's knowledge, none of the prior art devices provides the capability of manually engaging the clutch at speeds below the fixed engagement.

It is an object of this invention to provide a manual actuator that will give the operator the ability to engage the clutch at any time, independent of engine speed.

It is a further object of this invention to provide a manual actuator which will not interfere with the other aspects of operation of the constant variable transmission.

It is a further object of this invention to provide a manual actuator which is small enough to fit within the space available in the body of the vehicle. The amount of space available is set by the need to be able to remove the primary clutch without removing the engine from the vehicle, nominally 1.5 inches, with allowance for additional extension along the centerline of rotation.

SUMMARY OF THE INVENTION

In accordance with this invention, there is provided an actuator for a clutch comprising a fixed piston assembly and a movable cylinder assembly. The piston assembly contains a center cup, a piston, and bearing and seal cap assembly. The movable cylinder assembly contains a movable cylinder and a nosepiece.

BRIEF DESCRIPTION OF THE DRAWINGS

The preferred invention will be described by reference to this specification and its attached claims, and to the enclosed drawings in which like numerals refer to like elements, and wherein:

DESCRIPTION OF THE PREFERRED EMBODIMENTS

The preferred actuator of this invention comprises a cylinder assembly attached to and rotating with the primary clutch. This assembly closes the primary clutch a sufficient amount (nominally about 1/8") to cause engagement regardless of engine speed. All moving parts are concentric about the axis of rotation. By making the cylinder the moving element, the thickness of the actuator is small enough to fit in the available space. The diameter is set to provide sufficient force to accomplish engagement. The actual diameter may be changed from unit to unit to provide more or less area if necessary. Once installed, the engagement force is controlled by varying the pneumatic (or hydraulic) pressure applied.

Figure 1:
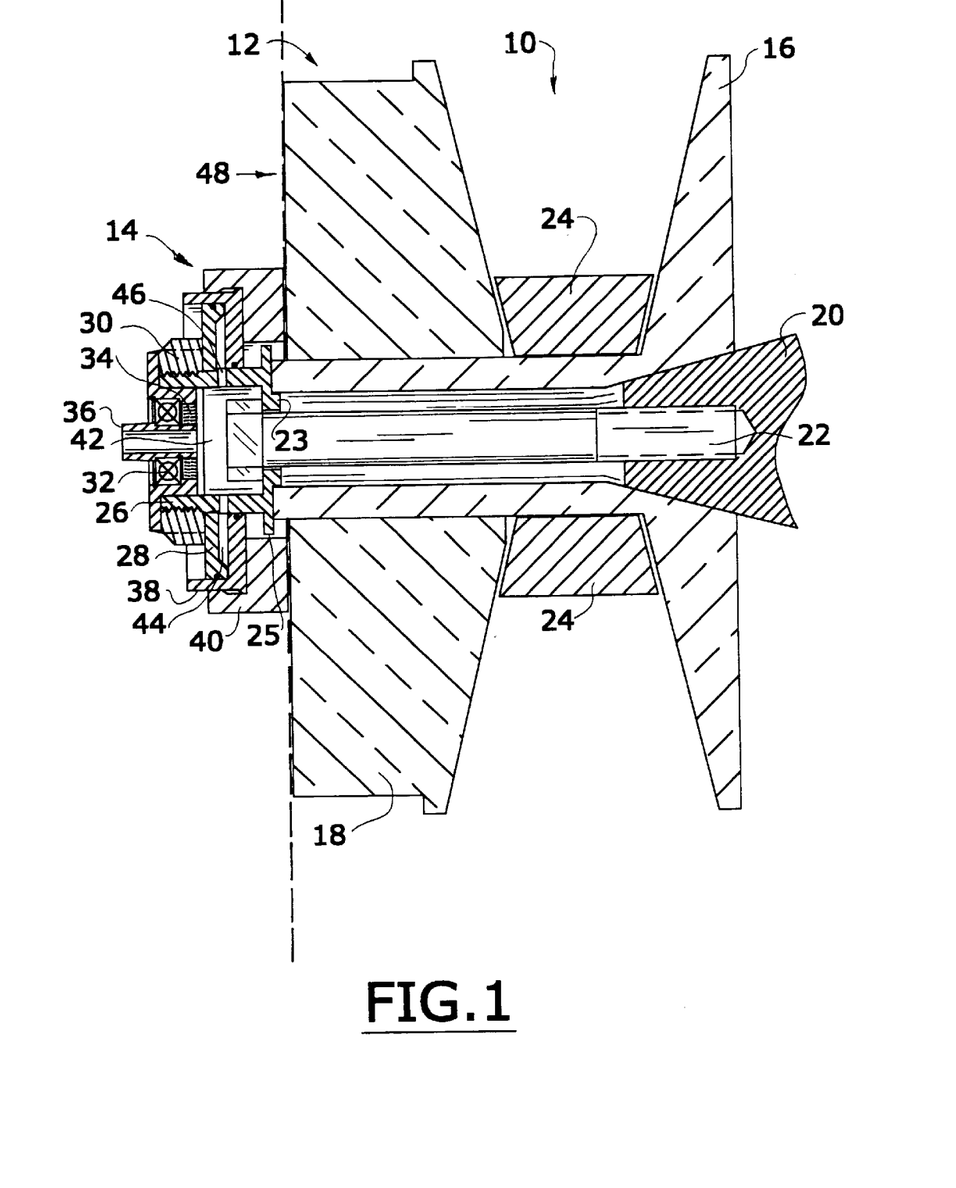
FIG. 1 is a sectional view of a clutch assembly in a disengaged state, wherein such assembly is operatively connected to applicant's manual actuator.

FIG. 1 is a sectional view of a clutch assembly 10 in its disengaged state. Referring to FIG. 1, it will be seen that clutch assembly 10 comprises a primary clutch assembly 12 and an actuator 14.

As is known to those skilled in the art, primary clutch assemblies are well known to those skilled in the art and are described, e.g., in U.S. Pat. Nos. 3,759,111, 3,605,510, 3,605,511, and the like. The entire disclosure of each of these United States patents is hereby incorporated by reference into this specification.

Figure 2:
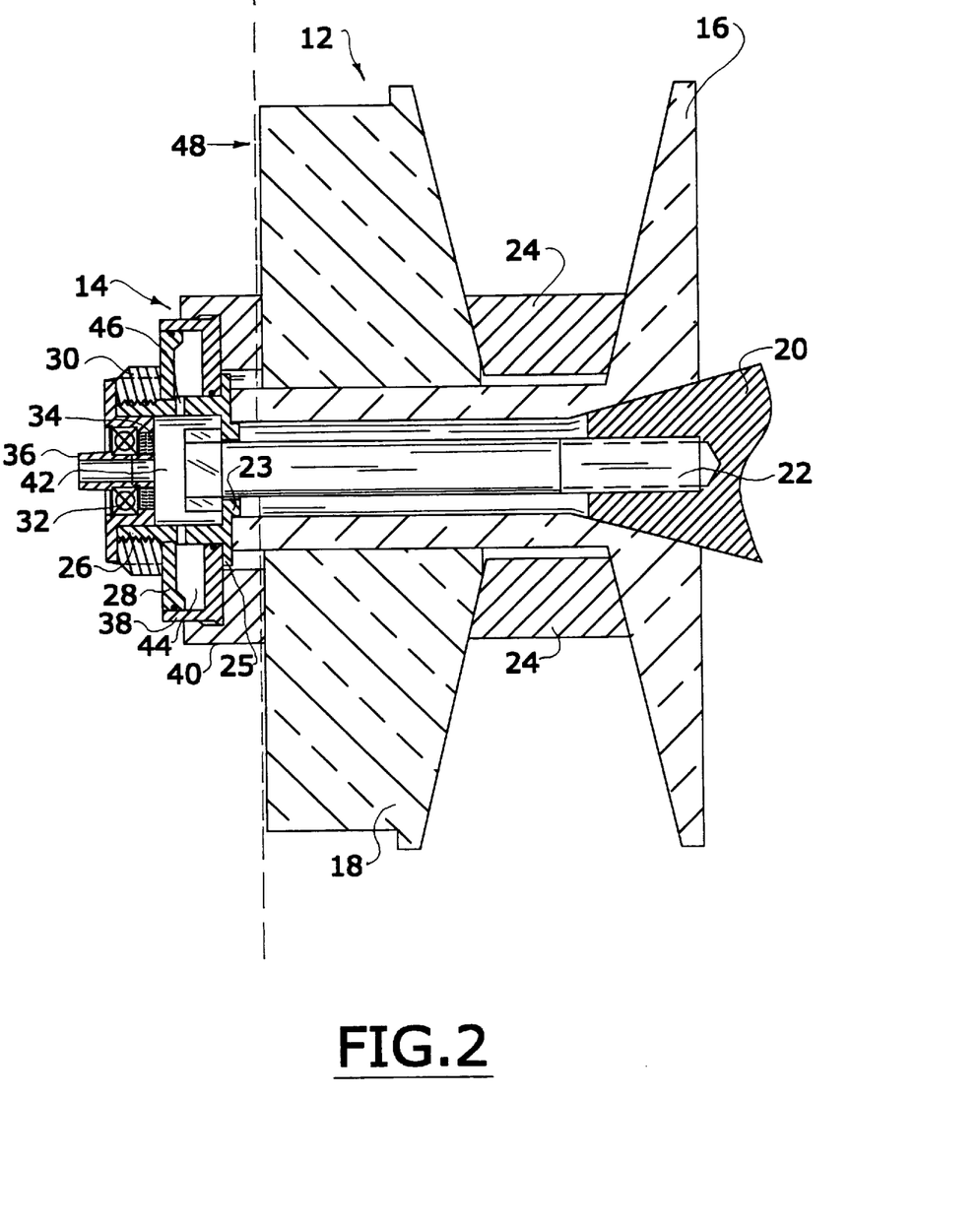
FIG. 2 is a sectional view of the clutch assembly of FIG. 1 in its engaged state.
Figure 3:
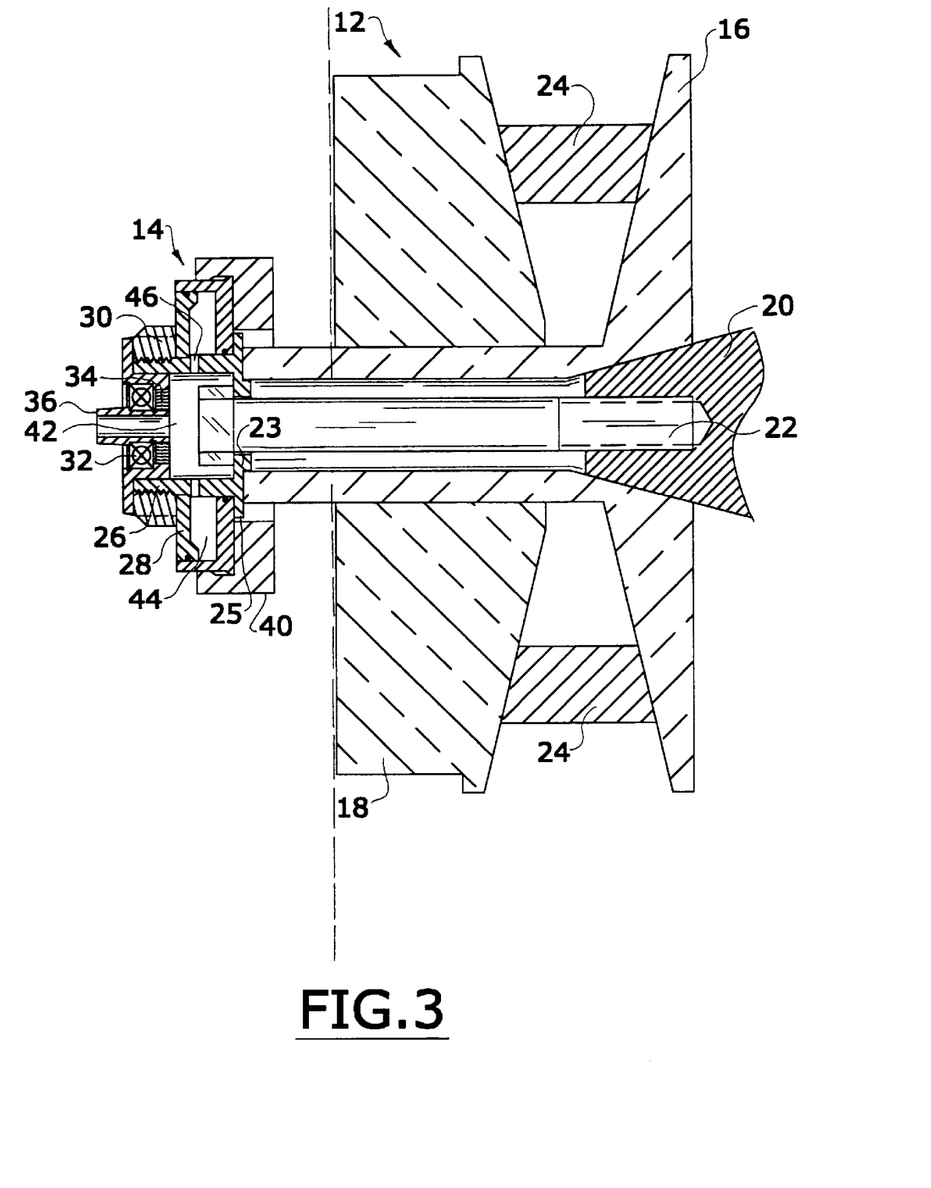
FIG. 3 is a sectional view of the clutch assembly of FIG. 1 in its engaged state, when the clutch is rotating at high speed.

Referring again to FIG. 1, and to FIGS. 2 and 3, the primary clutch assembly 12 depicted in said Figures is comprised of a fixed sheave and shaft assembly 16, a movable sheave assembly 18, engine crankshaft 20, attachment bolt 22, and drive belt 24. As is known to those skilled in the art, the primary clutch is activated by centrifugal force from the engine crankshaft. The moveable sheave of the clutch is forced in as the speed of the engine is increased. This contacts the drive belt. The drive belt will then be forced to a larger diameter within the clutch sheaves, thus pulling it to a smaller diameter within the driven unit sheaves. Reference may be had, e.g., to a publication entitled "Understanding Your Comet C.V.T. (Continuously Variable Transmission) Drive System" which was published by Comet Industries Division of Hoffco Inc. (358 N.W. F. Street, Richmond, Ind. 47374) in January, 1985 as publication number 160951.

Referring again to FIGS. 1, 2, and 3, it will be seen that actuator 14 is attached to primary clutch 12 by means of attachment bolt 22. Extension 23 which is integrally formed with flange 25 aligns the actuator 14 so that it is substantially concentric with the axis of rotation of clutch 12. Actuator 14 is comprised of a center cup 26, a piston 28, a seal cap assembly 30 which contains bearings 32 and seals 34 and also holds the piston 28 in place on the center cup 26. An inlet spindle 36 installs through the bearings 32 and seals 34 in the seal cap assembly 30.

The moving element of the actuator 14 is comprised of a cylinder 38 and a nose piece 40. The entire actuator 14 is held in place by the primary clutch center bolt 22. In addition to holding the assembly 14 in place, the bolt 22 also seals the base of the center cup 26.

The actuator 14 operates as described below. Pneumatic (or hydraulic) pressure is applied through the inlet spindle 36 of the seal cap assembly 30, thereby pressurizing the center chamber 42 of the center cup 26. The pressure is applied from the center chamber 42 to the space 44 between the piston 28 and cylinder 38 through radial holes 46 in the center cup 26. This causes the cylinder 38 to extend in the direction of arrow 48. The nosepiece 40 contacts the movable assembly 18 of the primary clutch 12, thereby overcoming its internal spring pressure (not shown) and engaging the drive belt 24 (see FIG. 2).

As engine speed increases and the transmission 12 begins to shift (see, e.g., the Comet Industries publication), contact with the nose piece 40 is lost and the transmission 12 operates normally (see FIG. 3).

The actual stroke of the cylinder 38 can be adjusted within its maximum range of travel by inserting shims (not shown) between the cylinder 38 and the piston 28.

The spacing of the nose piece 40 is also adjustable through the use of shims (not shown) between the nosepiece 40 and the cylinder 38.

The nose piece 40 is replaceable, and is specifically contoured to match each model and brand of clutch that the actuator 14 is adapted to.

Control of the actuator 14 is accomplished through controlling the air (or hydraulic) pressure applied to it. This is accomplished through the use of one of a number of different valves presently existing and designed for the purpose of controlling pneumatic (or hydraulic) devices. The valve actuation may be either direct manual operation, remote electrical operation by way of a solenoid valve operator, or remote pneumatic through the use of a pneumatic pilot operator. The control systems in the later two cases would be selected on a case basis using existing or custom built control hardware to suit the individual needs and desired features of the end user. The source of pneumatic pressure for the actuator is an on board reservoir. This may be charged with either compressed air or carbon dioxide. Regulated carbon dioxide reservoirs are already in use in racing applications and may be directly adapted. Although most racing applications would use an expendable reservoir, a replenishment supply for the reservoir such as a small compressor would allow for indefinite operation. If hydraulic operation is used, the source would be either a pump or an accumulator. These devices already exist in many forms for the intended purpose of supplying similar applications.

Figure 4:
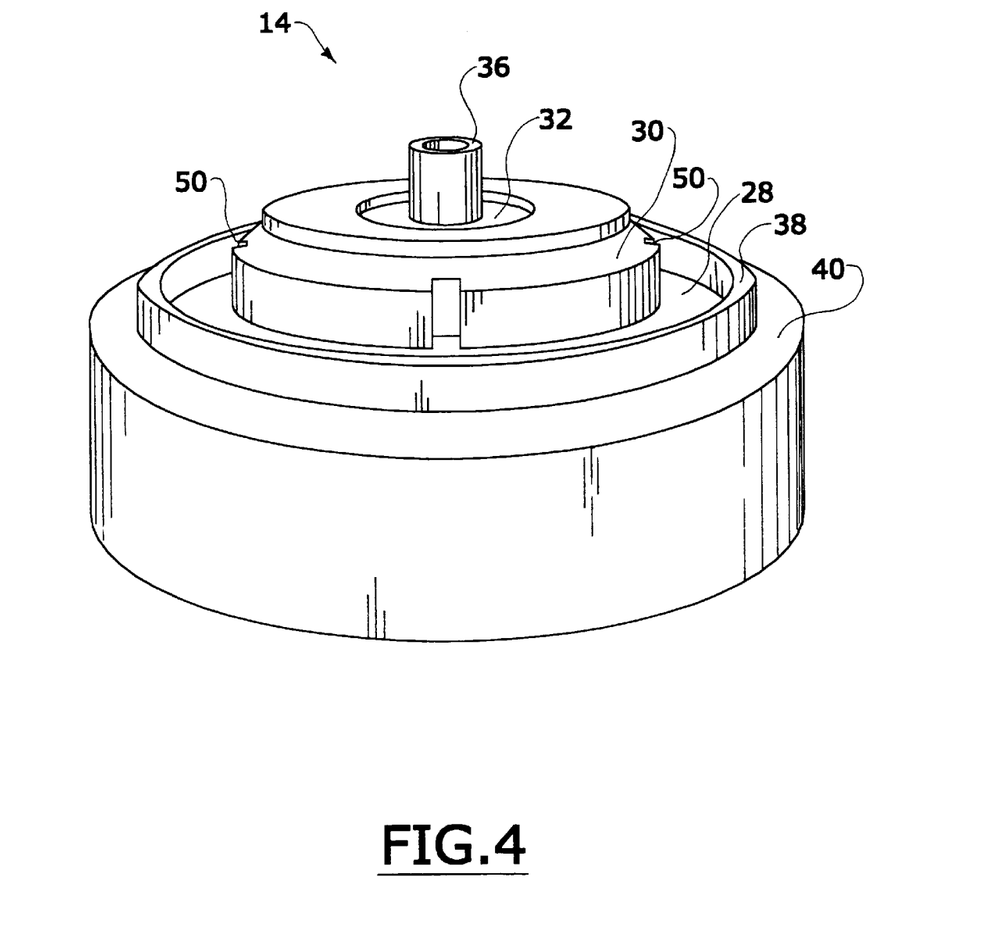
FIG. 4 is a perspective view of the actuator of this invention.

FIG. 4 is a perspective view of actuator 14. In the preferred embodiment illustrated in FIG. 4, it will be seen that bearing and seal cap assembly 30 is comprised of slots 50 which allow engagement of wrench for tightening.

Figure 5:
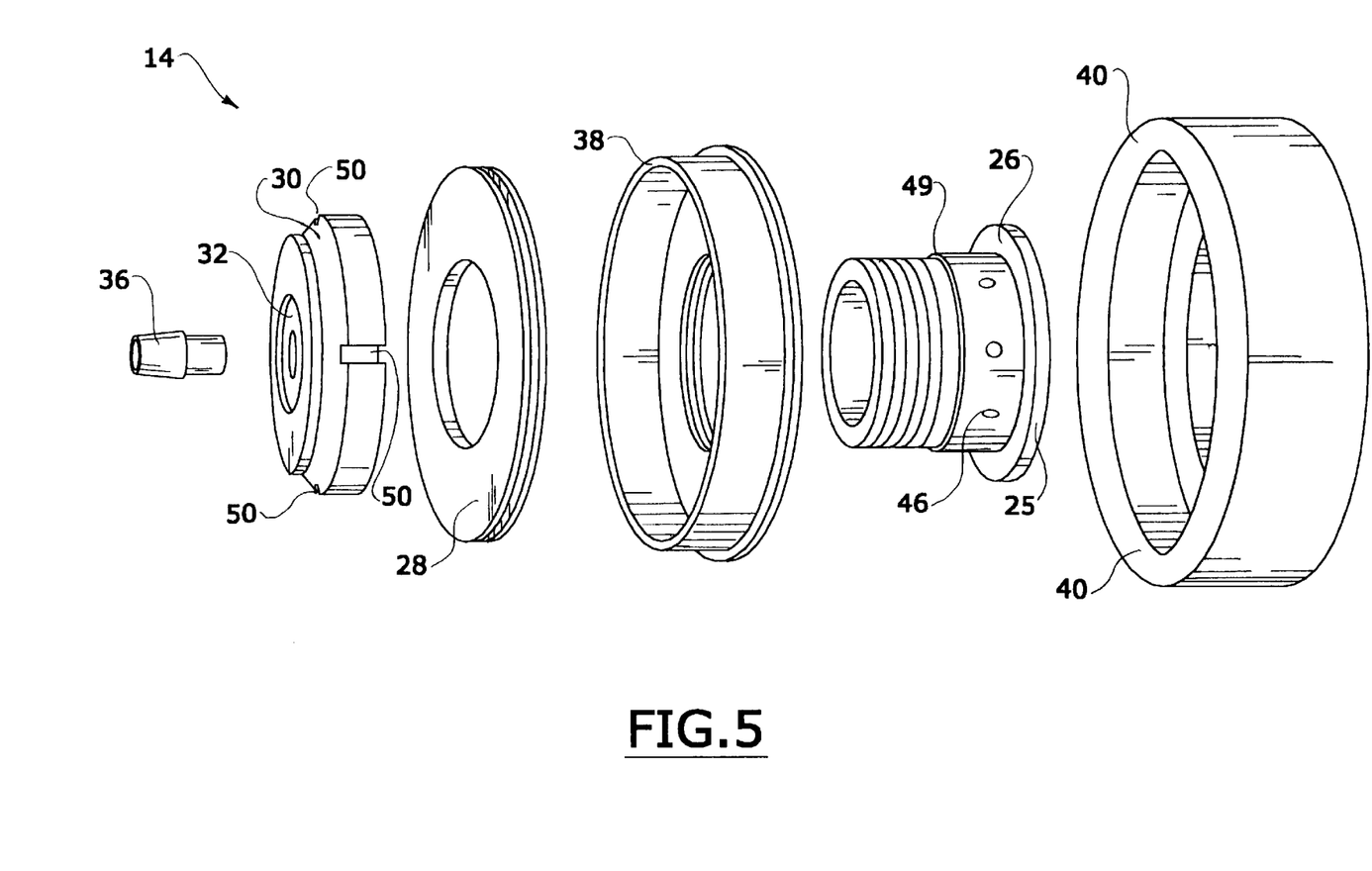
FIG. 5 is an exploded view of the actuator of this invention.
Figure 6:
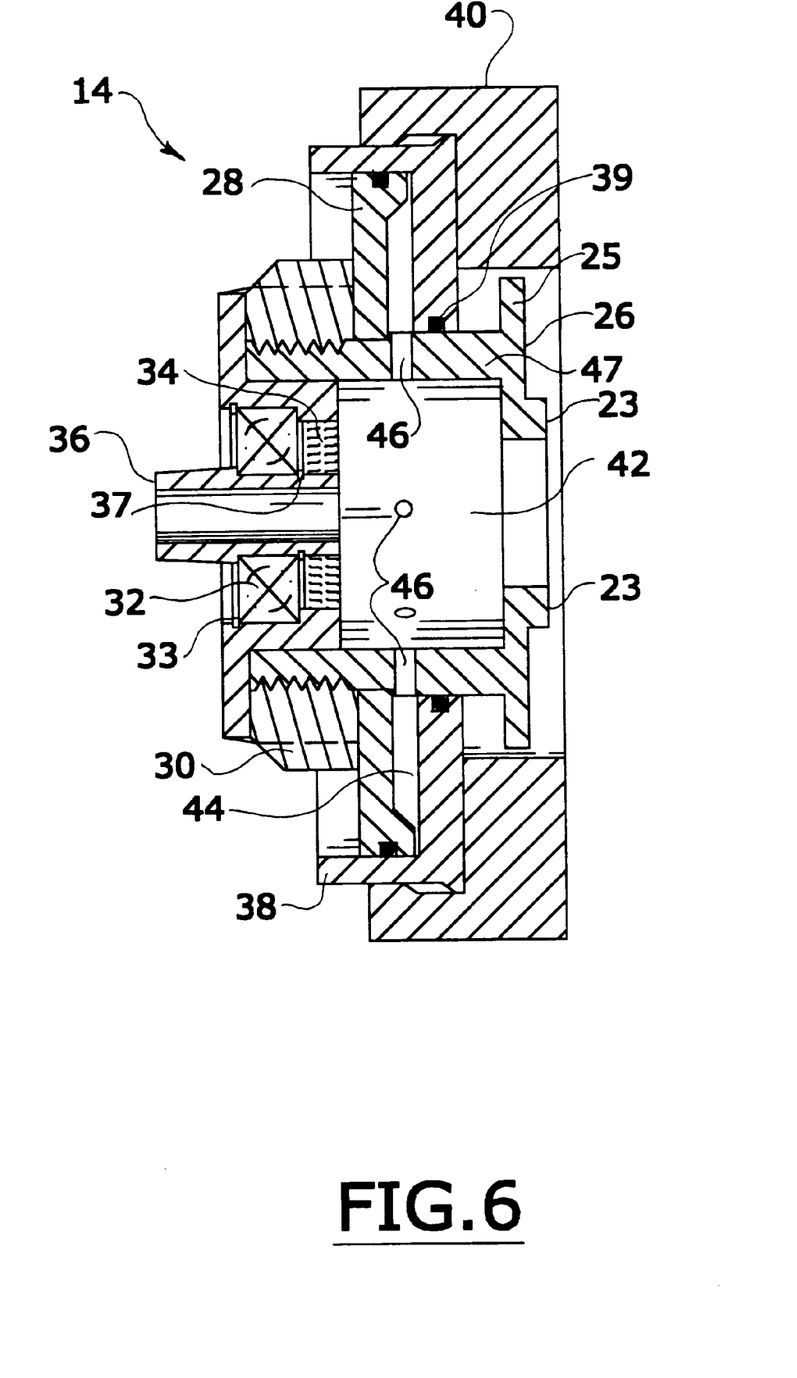
FIG. 6 is a sectional view of the actuator of this invention.

FIG. 5 is an exploded view of actuator 14 FIG. 6 is an enlarged sectional view of actuator 14. Referring to FIG. 6, and in the preferred embodiment depicted therein, it will be seen that radial holes 46, which extend through the sidewall 47 of center cup assembly 26, communicate with the chamber 44 between the cylinder 38 and the piston 28. It is preferred to have least 3 such radial holes disposed substantially equidistantly around the periphery of the the center cup assembly 26, and it is more preferred to have at least 10 such radial holes. In one embodiment, illustrated in FIG. 5, at least about 12 such radial holes are equidistantly disposed around center cup 26, and each of these radial holes as a diameter of from about 0.090" to about 0.110".

Referring to FIG. 6, and in the preferred embodiment depicted therein, it will be seen that orifices 46 are disposed at distance no greater than about 0.010 inches from flange 49. As will be apparent to those skilled in the art, depending upon the sizing of the components, the distance may vary. However, in general, it is desired that the orifices 46 do not overlap the sealing area (O-ring 39) between the piston 28 and the center cup 26.

Typically, the orifices are disposed at a distance no greater than 0.015 inches from flange 49. Such distance may be substantially zero.

As will be apparent to those skilled in the art, orifices 46 may have different cross-sectional shapes. Thus, e.g., they may be radial holes, they may be slots, they may have irregular cross-sectional shapes, and the like.

Referring again to FIG. 6, and in the preferred embodiment depicted therein, it will be seen that, at the intersection of cylinder 38 and center cup 26 is sealed O-ring 39, retained in a radial groove in cylinder 38. The intersection of piston 28 and cylinder 38 is sealed with an O-ring 29, retained in a radial groove in piston 28. Bearing 32 is retained in the bearing and seal assembly 30 by snap ring 33, located in a radial groove in the bore of bearing and seal assembly 30. The spindle 36 is retained in the bearing 32 by snap ring 37, located in a radial groove on the outside diameter of spindle 36. Seal 34 is located in the bearing and seal cap assembly 30 by press fit.

Figure 7:
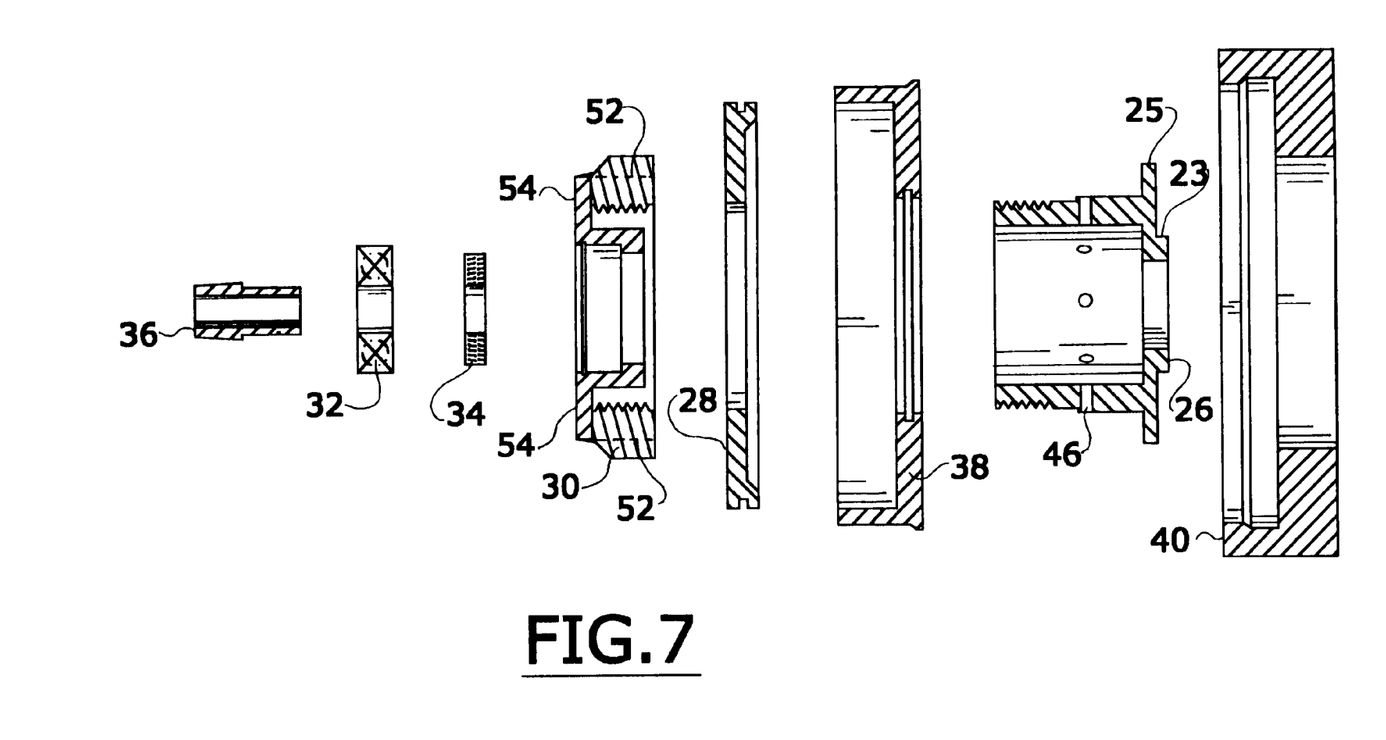
FIG. 7 is an exploded sectional view of the actuator of this invention.

FIG. 7 is an exploded sectional view. Referring to FIG. 7, it will be seen that bearing and seal cap assembly 30, in the preferred embodiment depicted, is comprised of a bearing lock nut 52 welded to a bearing and seal retainer 54.

Thus, as is illustrated in FIGS. 1–7, it will be seen that there is disclosed an apparatus for manually engaging a primary clutch of a constantly variable transmission, wherein said primary clutch has a first axis of rotation, wherein said apparatus is comprised of a fixed piston assembly enclosed within a movable cylinder assembly. The fixed piston assembly is comprised of a cylindrical center cup with a second axis of rotation, wherein said center cup is comprised of a flange integrally connected to a first stepped cylindrical section, and a second stepped cylindrical section integrally connected to said first stepped cylindrical section first stepped cylindrical section; the first stepped cylindrical section is comprised of a multiplicity of orifices extending through said first stepped cylindrical section and disposed at distance of less than about 0.010 inches from said flange; the second stepped cylindrical section is comprised of an exterior wall, at least a portion of which contains external threads; and the flange is comprised of means for aligning said second axis of rotation with said first axis of rotation. The fixed piston assembly is comprised of a piston connected to said second stepped cylindrical section, and it is also comprised of a bearing and seal cap assembly connected to said external threads of said second stepped cylindrical portion; and said movable cylinder assembly is comprised of a movable cylinder disposed within said first stepped cylindrical section and contiguous with said piston.

It is desired to keep actuator 14 as light as possible. To this end, it is preferred to fabricate the cylinder 38 and piston 28 from an aluminum alloy such 6061T6; in one preferred embodiment, anodized aluminum alloy material is used. However, because of strength requirements, it is preferred to fabricate the center cup 26, the bearing and seal assembly 30, and spindle 36 from steel, such as low carbon steel; in one preferred embodiment, case hardened steel assemblies are used.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. An apparatus for manually engaging a primary clutch of a constantly variable transmission, wherein said primary clutch has a first axis of rotation, wherein said apparatus is comprised of a fixed piston assembly enclosed within a movable cylinder assembly, and wherein:
   (a) said fixed piston assembly is comprised of a cylindrical center cup with a second axis of rotation, wherein said center cup is comprised of a flange integrally connected to a first stepped cylindrical section, and a second stepped cylindrical section integrally connected to said first stepped cylindrical section and forming a first intersection with said first stepped cylindrical section, wherein:
      1. said first stepped cylindrical section is comprised of a multiplicity of orifices extending through said first stepped cylindrical section,
      2. said second stepped cylindrical section is comprised of an exterior wall, at least a portion of which contains external threads;
      3. said flange is comprised of means for aligning said second axis of rotation with said first axis of rotation,
      4. said fixed piston assembly is comprised of a piston connected to said second stepped cylindrical section,
      5. said fixed piston assembly is comprised is of bearing and seal cap assembly connected to said external threads of said second stepped cylindrical portion; and
   (b) said movable cylinder assembly is comprised of a movable cylinder disposed within said first stepped cylindrical section and contiguous with said piston.

2. The apparatus as recited in claim 1, wherein said multiplicity of orifices is disposed at a distance of less than about 0.010 inches from said first intersection.

3. The apparatus as recited in claim 2, wherein said first stepped cylindrical section is comprised of at least about three orifices extending through said first stepped cylindrical section.

4. The apparatus as recited in claim 3, wherein each of said orifices has a substantially cylindrical cross sectional shape.

5. The apparatus as recited in claim 4, wherein said first stepped cylindrical section is comprised of at least about nine orifices extending through said first stepped cylindrical section.

6. The apparatus as recited claim 1, wherein said apparatus is comprised of a nose piece connected to said movable cylinder.

7. The apparatus as recited in claim 1, wherein said bearing and seal cup assembly is comprised of a multiplicity of external slots.

8. The apparatus as recited in claim 1, wherein said bearing and seal cap assembly is comprised of a bearing lock nut welded to bearing and seal retainer.

9. The apparatus as recited in claim 1, wherein each of said piston and said cylinder consists essentially of aluminum alloy material.

10. The apparatus as recited in claim 9, wherein a spindle is disposed within said bearing and seal cap assembly.

11. The apparatus as recited in claim 10, wherein each of said center cup, said bearing and seal assembly and said spindle consist essentially of steel.

12. The apparatus as recited in claim 11, wherein each of said piston and said cylinder consist of anodized aluminum alloy material.

13. The apparatus as recited in claim 12, wherein each of said center cup, said bearing and seal assembly, and said spindle consist essentially of case hardened steel.

* * * * *